Oct. 15, 1940.  E. D. WILKERSON  2,217,827
HYDRAULIC BRAKE SYSTEM BLEEDING AND FILLING APPARATUS
Filed April 3, 1939
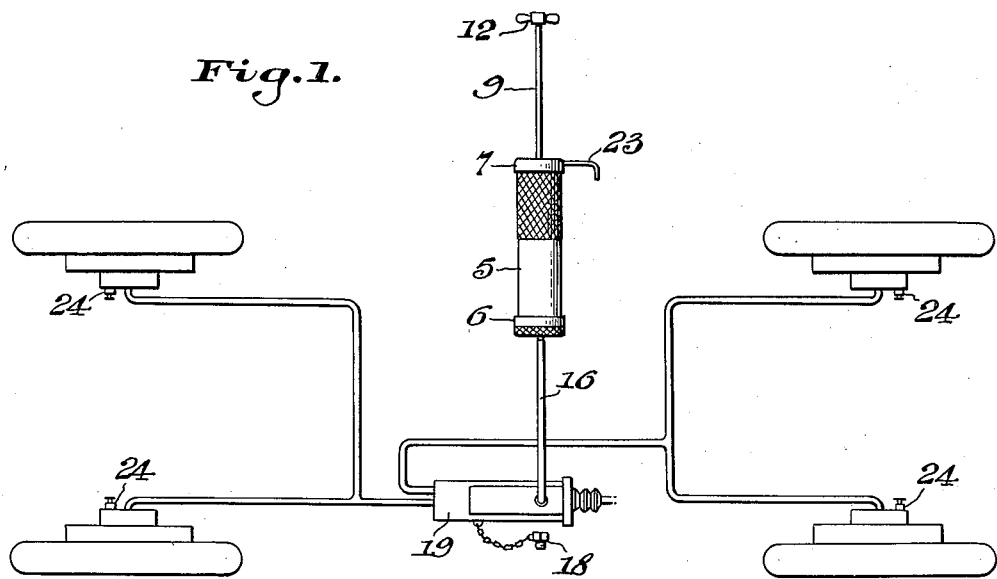
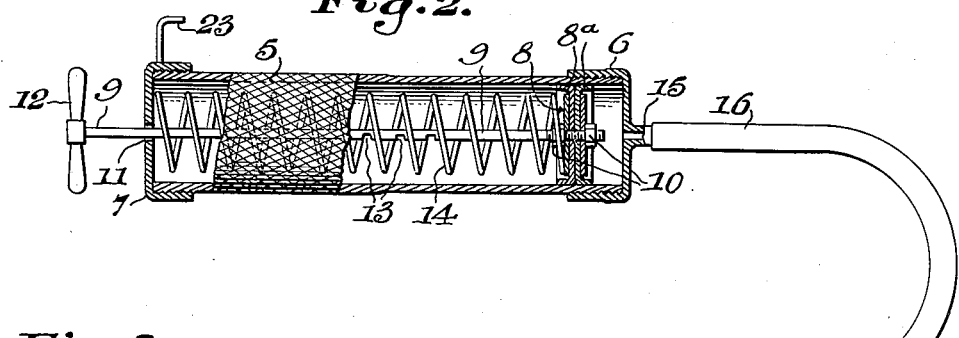
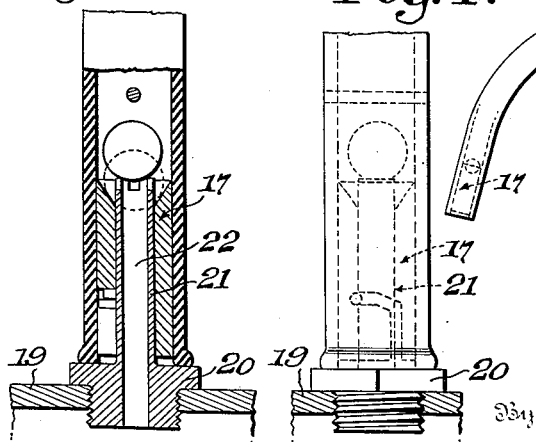
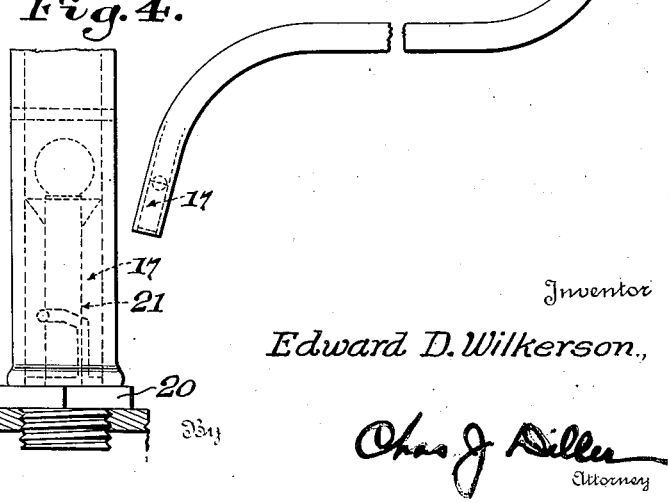
Inventor
Edward D. Wilkerson,
Chas. J. Diller
Attorney Patented Oct. 15, 1940

2,217,827

UNITED STATES PATENT OFFICE 2,217,827

HYDRAULIC BRAKE SYSTEM BLEEDING AND FILLING APPARATUS

Edward D. Wilkerson, Orange, N. J.

Application April 3, 1939, Serial No. 265,867

3 Claims. (Cl. 188—152)

This invention relates to new and useful improvements in hydraulic brake and brake servicing systems generally, although more particularly to novel hand apparatus whereby bleeding and/or filling of the fluid reservoirs and conduits incorporated in such brake systems is facilitated.

Hydraulic brake systems, as is well known, require certain servicing operations which include refilling of the main reservoir as the fluid level becomes low, and bleeding of the entire system should the brake action become inefficient as a result of air or dirt in the conduits.

In the bleeding operations certain conditions must be maintained. The reservoir and master cylinder must be kept filled in order to prevent additional air from entering the system.

Heretofore, the common method of bleeding hydraulic brake systems has been to remove the filled cap from the reservoir and then refill the same with additional fluid. Then a bleeder valve at one brake is opened. In order to force fluid through the then open conduit and exhaust the air therefrom, it is necessary to slowly pump the brake pedal. Then, when all air has been thus expelled and that particular conduit contains only fluid, the bleeder valve is closed. These operations are repeated on each of the remaining brakes.

The above described method is slow and laborious and is apt to result in a material loss of brake fluid, especially where a single mechanic attempts the entire job and cannot, of course, simultaneously pump the brake pedal and observe the discharge at the respective bleeder valves.

Through the use of this invention, the above mentioned difficulties are overcome.

Therefore, the principal object of the invention is to provide a hand tool for filling and bleeding hydraulic brake systems which comprises a fluid container having a mechanically urged piston axially movable therein and adapted to exert pressure on fluid within the container which in turn maintains a check valve disposed in a discharge nozzle in a normally closed position.

Another object of the invention is to provide a device of the above described character which is adapted to cooperate with the master cylinder and main reservoir of a hydraulic brake system to permit the same to be filled under pressure, the pressure being transmitted throughout the system whereby bleeding operations will be facilitated.

Another object of the invention is to provide a novel device of the above described character which will permit one man operation in the filling and bleeding of hydraulic brake systems.

A further object of the invention is to provide a device of the above described character which is portable in nature and so constructed that it can be positioned adjacent or over the master cylinder as by hanging from the steering wheel, radiator brace rod or other available support.

A still further object of the invention is to provide a device of the above described character which is simple in design, rugged in construction, and economical to manufacture.

A still further object of the invention is to provide a device of the above described character which is adapted to be used in conjunction with all vehicle hydraulic brake systems.

With these and other objects in view which will more fully appear, the nature of the invention will be more clearly understood by following the description, the appended claims, and the several views illustrated in the accompanying drawing.

In the drawing:

Figure 1 is a diagrammatic view of a hydraulic brake system with the tool constructed in accordance with the invention disposed in operative relation thereto.

Figure 2 is a side elevation, partly in section, of the tool.

Figure 3 is a detail elevation, partly in section, of the connection to the master cylinder, the check valve being open.

Figure 4 is a detail elevation of the connection to the master cylinder, the bayonet joint being indicated by dotted lines.

Referring to the drawing in detail, the invention is embodied in a hydraulic brake bleeding and filling unit which includes a cylindrical barrel or reservoir 5 having its lower end closed by a cap 6 threadably engaged thereon, and its upper end closed by a cap 7 likewise threadably engaged thereon.

A piston 8 is disposed within the barrel for axial movement and includes a pair of oppositely disposed leather washers 8ᵃ which create a seal within the barrel. The piston is secured to the lower end of a piston rod 9 as by clamping nuts 10, the other end of the rod extending upwardly through an aperture 11 in the upper cap and projecting therebeyond. The free end of the piston rod is provided with a handle 12 for manual manipulation. The piston rod is also provided with one or more notches 13 which are adapted to engage the rim of the aperture 11 for a purpose to be more fully described hereinafter.

A helical compression spring 14 encircles the piston rod 9 and is disposed with its upper end abutting the inner surface of the upper cap 7 and its lower end abutting the piston. It will be apparent that the spring 14 tends constantly to urge the piston towards the lower cap 6.

The lower cap 6 is fitted with an axially disposed discharge tube 15 having one end projecting outwardly therebeyond. A flexible discharge hose 16 has one end secured around the projecting end of the discharge tube 15 and its other end normally free.

A check valve 17 of any desired type which is normally adapted to prevent the flow of liquid from the barrel is secured in the flexible hose and is disposed near the free end thereof.

In order to fill the device it is only necessary to insert the free end of the flexible hose 16 into a supply of brake fluid, then slowly draw the handle 12 outwardly, thereby drawing the fluid in through the hose past the check valve 17 which normally permits flow in this direction and into that portion of the barrel between the lower cap 6 and the piston. When the desired amount of fluid has been drawn into the barrel, the piston is held in position by engaging one of the notches 13 formed in the piston rod with the rim of the aperture 11.

In using the invention the closure plug 18 of the master cylinder reservoir 19 is removed and replaced by a fitting 20 having a relatively long upstanding nipple 21 secured thereto and disposed in alignment with a fluid passage 22. The free end of the discharge hose 16 is then pressed over the nipple 21, the upper end of the nipple serving to trip or force open the check valve 17 and hold it open. The hose may be secured to the nipple as by a bayonet type locking joint to form an effective liquid seal therebetween. The device is then hung onto some convenient object such as the steering wheel or radiator brace rod through the medium of a hook 23 secured to the upper cap 7. The device should be kept in a substantially vertical position in order to maintain any air that might be in the reservoir at the top so that the air will not be forced through the discharge hose. Then the notch of the piston rod is disengaged from the aperture rim, which allows the spring 14 to actuate the piston to apply pressure to the fluid contained in the barrel. The fluid will thus be forced towards and into the master cylinder reservoir 19.

It will, therefore, be readily apparent that in this manner the master cylinder reservoir will be properly filled and fluid pressure transmitted throughout the brake system. Of course, it is to be understood that the force applied by the spring 14 is sufficiently great to effect the opening of the valve in the master cylinder 19.

While the drawing discloses the use of a straight upstanding nipple connected to the master cylinder reservoir, it is to be understood that nipples and fittings of other shapes may be employed according to the necessities of the particular installation.

In order to bleed the system, it is only necessary for the mechanic to open the bleeder valves 24 of the respective brakes, being assured that the spring urged piston of the device will insure a properly filled master reservoir and apply uniform bleeding pressure throughout the system.

It will be obvious that through the use of this invention the need for complicated and cumbersome apparatus is eliminated. There is also no need for employing compressed air tanks, or for the service of a helper to "pump" the brake pedal.

It is of course to be understood that the details of structure and arrangement of parts may be variously changed and modified without departing from the spirit and scope of my invention.

I claim:

1. A hand tool for use in filling and bleeding hydraulic brake systems comprising, a barrel having its ends respectively closed by upper and lower caps thereby forming a brake fluid reservoir, the upper cap having an axially disposed aperture formed therein, a piston disposed within said barrel for axial movement therein, a piston rod having its lower end connected to said piston and its upper end extending through said aperture in said cap and terminating in a handle, a discharge hose connected to said lower cap and being disposed in open communication with said barrel, a check valve secured near the free end of said hose and normally serving to prevent a flow of brake fluid from said reservoir, and means for urging said piston axially whereby piston pressure will be applied to brake fluid in said reservoir.

2. The combination with the master cylinder reservoir of a hydraulic brake system, of a filler plug including an axial bore, an upstanding nipple secured to said filler plug and disposed in register with said bore, a filling and bleeding implement disposed above said master cylinder reservoir and including a reservoir for brake fluid, a piston disposed within said reservoir for axial movement therein, a discharge hose connected to and disposed in open communication with the lower end of said reservoir and normally hanging free, a check valve secured near the free end of said hose and normally serving to prevent a flow of brake fluid from said reservoir, and means for urging said piston axially whereby piston pressure will be applied to the brake fluid in said reservoir, the free end of said discharge hose being adapted to engage the nipple of said filler plug, said nipple being proportioned to engage and force open and hold open said check valve whereby the piston pressure will forcibly discharge the brake fluid into and fill said master cylinder reservoir.

3. A hand tool for use in filling and bleeding hydraulic brake systems comprising, a barrel having its ends respectively closed by upper and lower caps thereby forming a brake fluid reservoir, the upper cap having an axially disposed aperture formed therein, a piston disposed within said barrel for axial movement therein, a piston rod having its lower end connected to said piston and its upper end extending through said aperture in said cap and terminating in a handle, a discharge hose connected to said lower cap and being disposed in open communication with said barrel, means for urging said piston axially whereby brake fluid will be forcibly discharged through said hose, and interengaging means formed on said apertured cap and said piston rod for releasably holding said rod retracted against the urge of said spring.

EDWARD D. WILKERSON.